United States Patent
Almquist et al.

(10) Patent No.: US 8,237,307 B2
(45) Date of Patent: Aug. 7, 2012

(54) TIME-SHARED DIGITAL POWER CONTROLLER

(75) Inventors: Edward Almquist, Bartlett, IL (US); Steve DeCabooter, Middleton, WI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 246 days.

(21) Appl. No.: 12/627,793

(22) Filed: Nov. 30, 2009

(65) Prior Publication Data
US 2011/0127986 A1 Jun. 2, 2011

(51) Int. Cl.
*H02J 1/10* (2006.01)

(52) U.S. Cl. .......................................................... 307/20
(58) Field of Classification Search ....................... 307/20
See application file for complete search history.

(56) References Cited

U.S. PATENT DOCUMENTS

| 2008/0150368 A1* | 6/2008 | Gurcan | 307/82 |
| 2010/0002473 A1* | 1/2010 | Williams | 363/21.06 |

* cited by examiner

*Primary Examiner* — Robert L. Deberadinis (57) ABSTRACT

Methods and systems for providing electrical power, including determining a plurality of fine power duty cycles according to a respective plurality of power values, and generating the respective plurality of power values using a time-shared pulse-width modulator (PWM), the time-shared PWM being configured to be modulated at the respective plurality of fine duty power cycles during a respective plurality of time slots.

10 Claims, 5 Drawing Sheets

METHOD
400

```
┌─────────────────────────────────────────────────────────────────────────┐
│ CONFIGURE A SHARED PULSE WIDTH MODULATOR (SPWM) TO CONTROL N POWER      │
│ RAILS, N BEING AN INTEGER., THE SPWM BEING CONFIGURED TO RECEIVE N ONES │
│ OF A SPWM INPUT INDICATIVE OF A TARGET DUTY CYCLE AND GENERATE N ONES   │
│ OF A SPWM OUTPUT TO CONTROL THE N POWER RAILS  410                      │
└─────────────────────────────────────────────────────────────────────────┘
                                   │
                                   ▼
┌─────────────────────────────────────────────────────────────────────────┐
│ CONFIGURE N TIME SLOTS TO PROCESS THE N ONES OF THE SPWM INPUT AND THE  │
│ SPWM OUTPUT, THE CONFIGURATION OF THE N TIME SLOTS INCLUDING ASSIGNING  │
│ EACH ONE OF THE N TIME SLOTS TO PROCESS EACH OF THE N ONES INCLUDING A  │
│ DEDICATED ONE OF THE SPWM INPUT AND THE SPWM OUTPUT  420                │
└─────────────────────────────────────────────────────────────────────────┘
                                   │
                                   ▼
┌─────────────────────────────────────────────────────────────────────────┐
│ DETERMINE WHETHER A SELECTED SPWM INPUT IS THE DEDICATED ONE  430       │
└─────────────────────────────────────────────────────────────────────────┘
                                   │
                                   ▼
┌─────────────────────────────────────────────────────────────────────────┐
│ EXECUTE SELECTABLE CONTROLS FOR CONTROLLING THE TARGET DUTY CYCLE       │
│ FOR EACH OF THE N ONES, THE SELECTABLE CONTROLS BEING SELECTED IN       │
│ ACCORDANCE WITH THE SELECTED INPUT  440                                 │
└─────────────────────────────────────────────────────────────────────────┘
                                   │
                                   ▼
┌─────────────────────────────────────────────────────────────────────────┐
│ DETERMINE A NUMBER OF THE N TIME SLOTS REQUIRED TO GENERATE THE         │
│ TARGET DUTY CYCLE FOR EACH OF THE N ONES OF THE SPWM INPUT, EACH TIME   │
│ SLOT THAT IS ASSIGNED TO PROCESS THE SELECTED SWPM INPUT OTHER THAN     │
│ THE DEDICATED ONE CONTRIBUTING TO 1/N PORTION OF THE TARGET DUTY CYCLE  │
│ AND THE DEDICATED ONE CONTRIBUTES TO A PORTION OF THE TARGET DUTY       │
│ CYCLE THAT IS AT MOST EQUAL TO 1/N  450                                 │
└─────────────────────────────────────────────────────────────────────────┘
                                   │
                                   ▼
┌─────────────────────────────────────────────────────────────────────────┐
│ EXECUTE THE SELECTABLE CONTROLS TO GENERATE THE TARGET DUTY CYCLE       │
│ FOR EACH OF THE N ONES OF THE SPWM INPUT  460                           │
└─────────────────────────────────────────────────────────────────────────┘
                                   │
                                   ▼
┌─────────────────────────────────────────────────────────────────────────┐
│ CONTROL THE N POWER RAILS BY ASSERTING THE SPWM OUTPUT IN ACCORDANCE    │
│ WITH THE TARGET DUTY CYCLE  470                                         │
└─────────────────────────────────────────────────────────────────────────┘
```

TIME-SHARED DIGITAL POWER CONTROLLER

I. BACKGROUND

The invention relates generally to the field of power supplies and power conversion.

II. SUMMARY

In one respect, disclosed is a method for providing electrical power, the method comprising determining a plurality of fine power duty cycles according to a respective plurality of power values; and generating the respective plurality of power values using a time-shared pulse-width modulator (PWM), the time-shared PWM being configured to be modulated at the respective plurality of fine duty power cycles during a respective plurality of time slots.

In another respect, disclosed is a system for analyzing communication options, the system comprising: one or more processors; one or more memory units coupled to the one or more processors; a time-shared PWM coupled to the one or more processors; the system being configured to determine a plurality of fine power duty cycles according to a respective plurality of power values; and the time-shared PWM being configured to generate the respective plurality of power values, the time-shared PWM being configured to be modulated at the respective plurality of fine duty power cycles during a respective plurality of time slots.

In yet another respect, disclosed is a computer program product stored on a computer operable medium, the computer program product comprising software code being effective to analyze communication options by being effective to: determine a plurality of fine power duty cycles according to a respective plurality of power values; and cause a time-shared PWM to generate the respective plurality of power values, and further cause the time-shared PWM to be modulated at the respective plurality of fine duty power cycles during a respective plurality of time slots.

Numerous additional embodiments are also possible.

III. BRIEF DESCRIPTION OF THE DRAWINGS

Other objects and advantages of the invention may become apparent upon reading the detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

IV. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. The functionality of various circuits, devices or components described herein may be implemented as hardware (including discrete components, integrated circuits and systems-on-a-chip), firmware (including application specific integrated circuits and programmable chips), software or a combination thereof, depending on the application requirements. Upon reading this disclosure, many alternative embodiments of the present invention will be apparent to persons of ordinary skill in the art.

The following terminology may be useful in understanding the present disclosure. It is to be understood that the terminology described herein is for the purpose of description and should not be regarded as limiting.

System—One or more interdependent elements, components, modules, or devices that co-operate to perform one or more predefined functions.

Configuration—Describes a set up of elements, components, modules, devices, and/or a system, and refers to a process for setting, defining, or selecting hardware and/or software properties, parameters, or attributes associated with the elements, components, modules, devices, and/or the system. For example, a power converter may be configured to provide a 12 VDC output.

Duty cycle—The duty cycle is generally defined as a ratio (or a percentage) of time a device is on. Assuming a cycle includes an on period and an off period, the duty cycle is the on period over one cycle.

In some embodiments, digitally controlled power converters may play a vital role in providing desired electrical power to loads such as a computer system or an electronic device, each having its own specification in terms of voltage, current, frequency, phase, quality, and other electrical parameters. A power converter (may also be referred to as a power supply, a power regulator, a voltage regulator, a power conditioner, and others) may typically refer to an electrical device that receives an input power signal having a first set of electrical properties and converts the signal to an output power signal having a second set of electrical properties. A direct current (DC) to DC (DC/DC) power converter is a power conversion device having both input and output signals that are DC.

In some embodiments, a DC/DC power converter may typically provide regulated power to power multiple power rails or loads (e.g., 3 VDC, 5 VDC, 12 VDC, and others depending on the application). For example, in automotive applications various DC power subsystems may be powered by 10-15 power rails, each power rail being specified by desired electrical parameters such as voltage, current, ripple content and others. The multiple power rails may be required to provide regulated power to various electronic devices (referred to as loads) such as electric motors, processors, controllers, infotainment devices, and others within an electronic system. The loads may draw currents that may vary from a few milliamperes to several amperes.

A digital controller such as a pulse width modulator (PWM) may be included in the digitally controlled power converter to control the output voltage at a desired set point by adjusting a duty cycle of an input voltage. Any changes in the power conversion inputs or outputs are adjusted by the digital controller to maintain the output voltage at the desired set point. Use of digital control technology (e.g., compared to analog control) may be preferred to implement the digital controller. The digital controller may deploy dedicated hardware and software resources (e.g., a dedicated processor) to individually control each one of the multiple power rails. However, the technique of using dedicated resources per loop may increase silicon area, increase cost, and may increase power consumed, thereby decreasing power conversion efficiency. The increases in the silicon area required and the cost may be significant in power conversion applications that may require greater than N power rails, N being an integer having an application dependent configurable value.

In some embodiments, the digitally controlled power converter may deploy all regulated loops that are controlled by digital control technology, e.g., by enabling full duty cycle digital control for each power rail. The use of digital controls may provide a shared architecture for a power converter having decreased silicon area, decreased cost, and decreased power consumed, thereby increasing power conversion efficiency.

In some embodiments, a solution for providing an improved power converter may deploy a shared pulse width modulator (SPWM) that shares the available digital resources to control the N power rails and respective loads. Specifically, the SPWM may be configured to digitally control a fine target duty cycle for each of the N power rails by using time division multiplexing (TDM). The target duty cycle for each of the N power rails may be received as N channel inputs and processed over N time slots to generate N channel outputs, with one output to control each of the N power rails. The N time slots may be processed in a round robin manner. If the time slot number matches the channel input number, e.g., time slot #M and channel #M (M being an integer between 1 and N), then the available digital processing resources are utilized during time slot #M to process channel #M in a dedicated manner and N channels other than channel M in a shared manner. The dedicated processing of channel #M enables high-precision control of the target duty cycle linearly controllable between 0 and 1/N percent of the total available power/voltage.

In addition, the processing of N channels other than channel #M enables coarse level control (e.g., on/off control) of the target duty cycle in exact increments of 1/N percent. For example, a SPWM may have 4 channel inputs to receive the target duty cycle and 4 time slots to process and generate 4 of the SPWM outputs to control 4 power rails. A target duty cycle of 95% received on channel #2, may be processed as 25% duty cycle generated during each of the 3 time slots (a more coarse duty cycle) (time slots #1, #3 and #4 for performing shared coarse level control) and a remaining 20% duty cycle generated during time slot #2 for performing dedicated high-precision control, the combined duty cycle generated in the 4 time slots being equal to the 95% target duty cycle.

In some embodiments, the SPWM may be configured to determine an exact number of time slots required to generate the target duty cycle for each one of the N channels. In the above example, a number of time slots to generate a 95% target duty cycle may be calculated by dividing 95% by 1/N or 25%, which has 3 as an integer quotient and $^{20}/_{25}$ as the remainder. Therefore, 3 of 4 time slots (other than #2) may be used to generate the 75% duty cycle and the remaining 20% of the duty cycle may be generated by time slot #2. As another example, a number of time slots to generate a target duty cycle of 5% may be calculated by dividing 5% by 25%, which has 0 as an integer quotient and $^{5}/_{25}$ as the remainder. Therefore, no additional time slots except for time slot #2 may be required to generate the target duty cycle of 5%.

In some embodiments, the SPWM may execute selectable controls in dependence of whether the time slot number matches a channel input number. For example, the SPWM may execute second type controls (e.g., coarse type control) to generate the target duty cycle during the shared coarse level control phase and the SPWM may execute second type controls (e.g., high-precision control) that is configured to linearly control the target duty cycle for at least a portion of a time slot during the high-precision level control phase.

Figure 1:
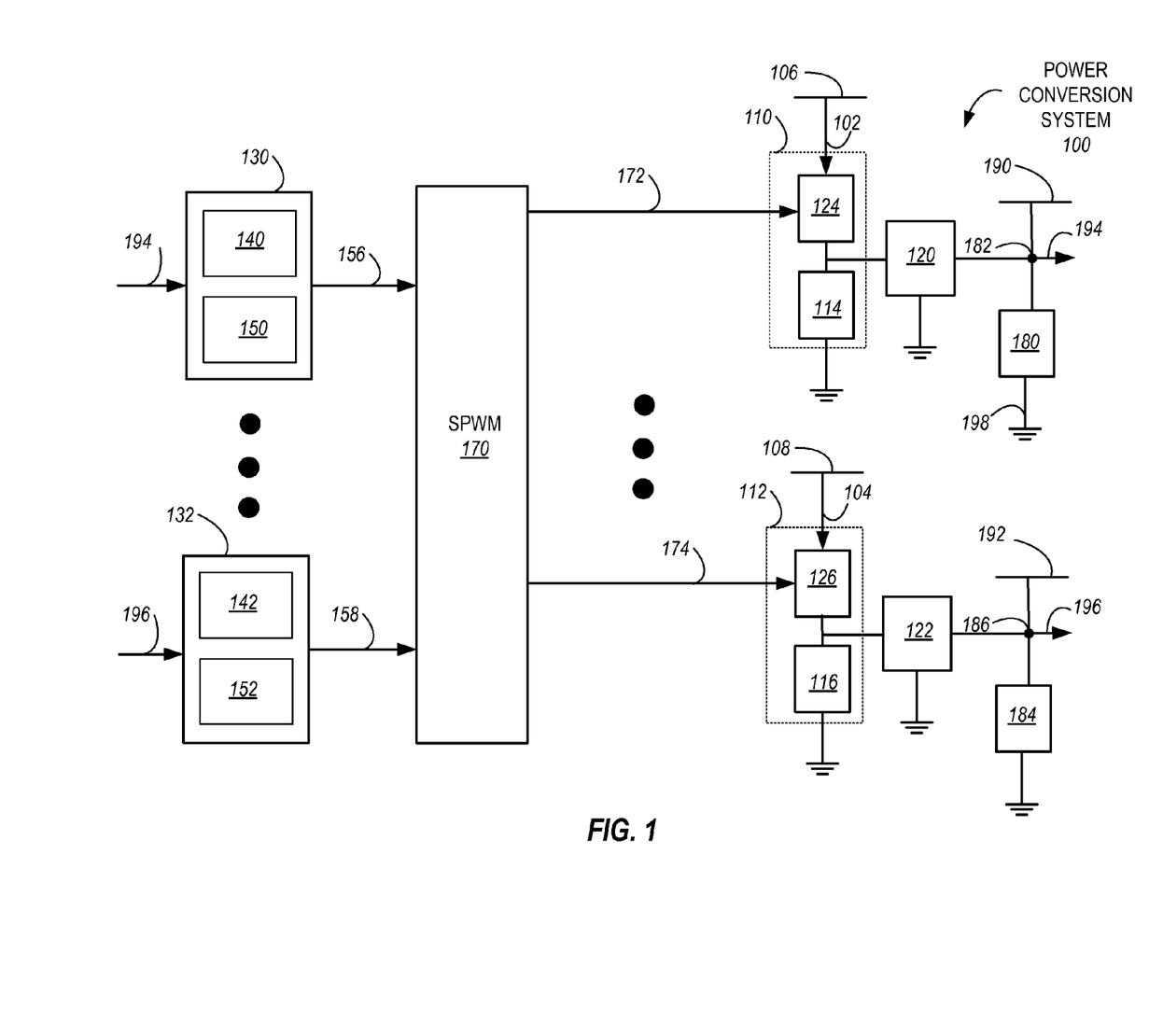
FIG. 1 is a block diagram illustrating a power conversion system, in accordance with some embodiments.

FIG. 1 is a block diagram illustrating a power conversion system, in accordance with some embodiments. FIG. 1 is a block diagram illustrating power conversion system 100.

In some embodiments, the power conversion system 100 is configured to provide regulated power to N power rails 190, 192, N being an integer. In the depicted embodiment, although only 2 control loops are shown for controlling 2 power rails to reduce complexity and improve clarity it is understood that the N number of power rails included in the power conversion system 100 may vary. A particular value of N selected may be application dependent, e.g., may typically vary between 1 and 20. The power conversion system 100 includes dedicated components (dedicated to control a particular power rail of the N power rails 190, 192) and shared components (shared across multiple power rails) to control each one of the N power rails 190, 192. A first load 180 may be coupled between an output terminal 182 and a reference terminal 198 such as ground. A Nth load 184 may be coupled between a Nth output terminal 186 and the reference terminal 198.

Included in the dedicated components are a first power converter input circuit 110 coupled to receive an first input 102 from a first voltage source 106, a first power converter output circuit 120 coupled to the first power converter input circuit 110 and configured to provide the regulated power to the first power rail 190. A first dedicated digital controller 130 may include a first analog-to-digital (A/D) converter 140 to convert a first feedback signal 194 indicative of a voltage of the first power rail 190 to a digital value. A first duty cycle controller 150 is configured to receive the digital value from the first A/D converter 140 and generate a first target duty cycle 156 corresponding to the first power rail 190. Also included in the dedicated components are a Nth power converter input circuit 112 coupled to receive an Nth input 104 from a Nth voltage source 108, a Nth power converter output circuit 122 coupled to the Nth power converter input circuit 112 and configured to provide the regulated power to the Nth power rail 192. A Nth dedicated digital controller 132 may include a Nth analog-to-digital (A/D) converter 142 to convert a Nth feedback signal 196 indicative of a voltage on the Nth power rail 192 to a digital value. A Nth duty cycle controller 152 is configured to receive the digital value from the Nth A/D converter 142 and generate a Nth target duty cycle 158 corresponding to the Nth power rail 192.

In some embodiments, a shared (or time-shared) pulse width modulator (SPWM) 170 may be configured as a digital controller to receive N ones of the target duty cycle inputs and generate N ones of a control signal output, one target duty cycle input and one control signal output per power rail. In the depicted embodiment, the first target duty cycle 156 is received as a first SPWM input (via channel #1) and the Nth target duty cycle 158 is received as a Nth SPWM input (via channel #N). In the depicted embodiment, the SPWM 170 may be configured to generate a first SPWM output 172 in response to receiving the first target duty cycle 156 as input, the first SPWM output 172 being used to control a duty cycle of the first input 102 and therefore control the first power rail 190. Similarly, the SPWM 170 may be configured to generate a Nth SPWM output 174 in response to receiving the Nth target duty cycle 158 as input, the Nth SPWM output 174 being used to control a duty cycle of the Nth input 104 and therefore control the Nth power rail 192.

In some embodiments, the first power converter input circuit 110 may include a first switch 124 (controlled by the first SPWM output 172) and a clamp 114. The switch 124 may be implemented as a field effect transistor (FET). Operation of the first switch 124 may be controlled by asserting or deasserting the first SPWM output 172, which is used for adjusting a duty cycle of the first input 102. The time duration of the on or off state of the switch 124 controls a duty cycle of the first power rail 190 of the power conversion system 100. Adjusting the duty cycle controls an average power output provided to the load 180 by adjusting the output voltage at the output terminal 182 in response to the changes in the load 180. Similarly, the Nth power converter input circuit 112 may include an Nth switch 126 (controlled by the Nth SPWM output 174) and an Nth clamp 116. The switch 126 may be implemented as a field effect transistor (FET). Operation of the Nth switch 126 may be controlled by asserting or deasserting the Nth SPWM output 174, which is used for adjusting a duty cycle of the Nth input 104.

In some embodiments, the first power converter output circuit 120 may include a filter such as an inductor capacitor (LC) filter to filter out undesired frequencies and provide power to the first power rail 190. Thus, a digital control loop for controlling the first power rail 190 may include the first feedback signal 194, the first dedicated digital controller 130, the SPWM 170, and the first SPWM output 172 to control the duty cycle associated with the first power rail 190 by controlling the first switch 124. Similarly, the Nth power converter output circuit 122 may include an inductor capacitor (LC) filter to filter out undesired frequencies and provide power to the Nth power rail 192. Thus, a digital control loop for controlling the Nth power rail 192 may include the Nth feedback signal 196, the Nth dedicated digital controller 132, the SPWM 170, and the Nth SPWM output 174 to control the duty cycle associated with the Nth power rail 192 by controlling the Nth switch 126.

In some embodiments, each one of the first dedicated digital controller 130 and the Nth dedicated digital controller 132 may be implemented by using one or more processors or other logic circuits to perform control of the power conversion system 100. The SPWM 170 may be implemented by using one or more processors or other logic circuits to perform control of the power conversion system 100. In some embodiments, one or more processors may be used to implement the first dedicated digital controller 130, the Nth dedicated digital controller 132, and the SPWM 170.

In some embodiments, the first dedicated digital controller 130 may include a first analog-to-digital (A/D) converter 140 to convert the first feedback signal 194 to a digital value. A first duty cycle controller 150 may be configured to receive the digital value from the first A/D converter 140 and generate the first target duty cycle 156 in response to the digital value. Similarly, the first Nth digital controller 132 may include a Nth analog-to-digital (A/D) converter 142 to convert the Nth feedback signal 196 to a digital value. A Nth duty cycle controller 152 may be configured to receive the digital value from the Nth A/D converter 142 and generate the Nth target duty cycle 158 in response to the digital value.

Additional details of the SPWM 170 are described with reference to FIGS. 2 and 3.

Figure 2:
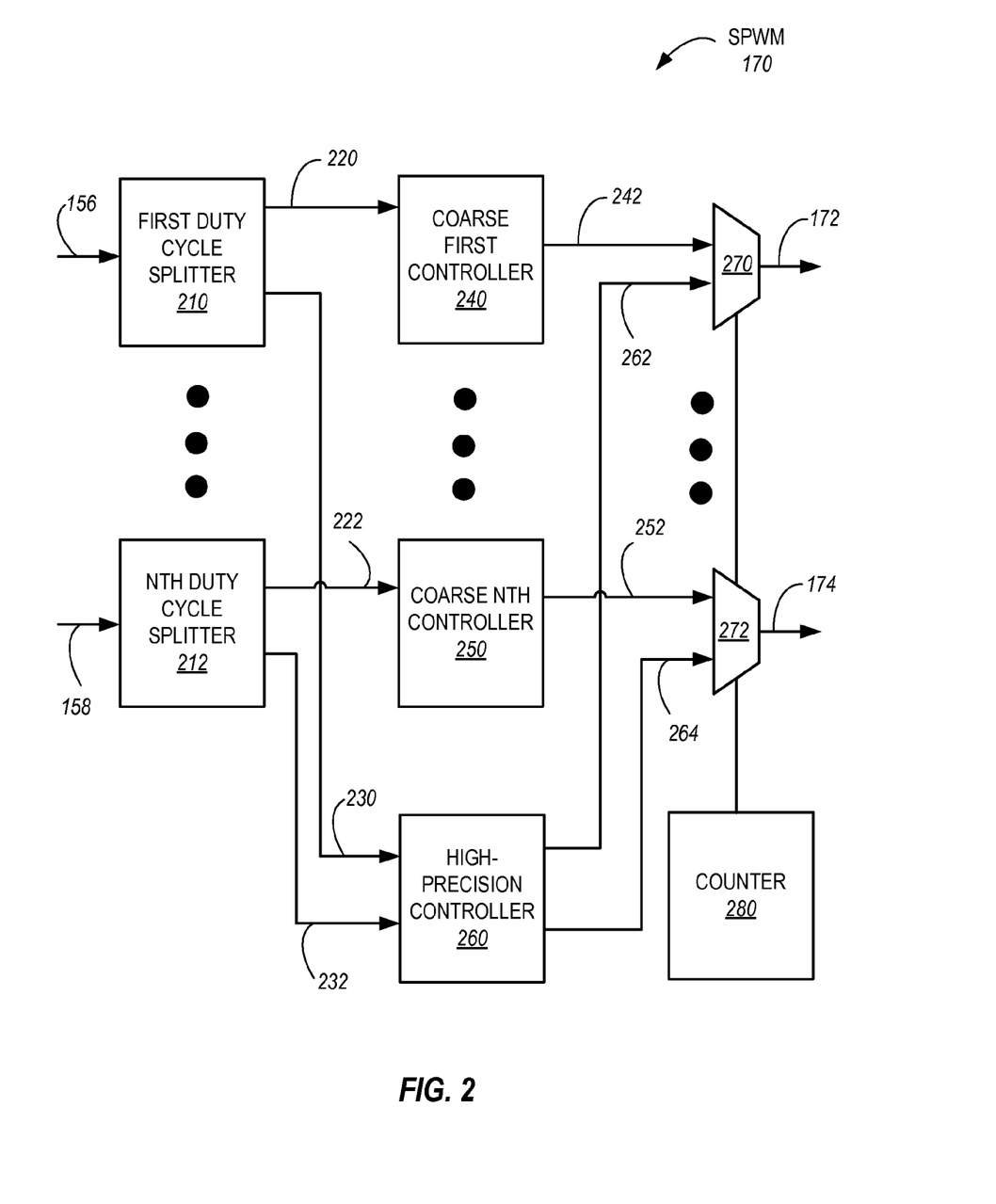
FIG. 2 is a block diagram illustrating additional details of a shared pulse width modulator (SPWM) described with reference to FIG. 1, in accordance with some embodiments.

FIG. 2 is a block diagram illustrating additional details of a shared pulse width modulator (SPWM) described with reference to FIG. 1, in accordance with some embodiments.

In some embodiments, the SPWM 170 may include N ones of a duty cycle splitter, one duty cycle splitter corresponding to each target duty cycle output provided by a corresponding one of a dedicated digital controller. The duty cycle splitter splits or divides the target duty cycle into two portions, a coarse target duty cycle control portion and a high-precision (or fine) duty cycle control portion for each SPWM input. The two portions are executed separately using high-precision level and coarse level controls and then combined by a corresponding multiplexer driven by a counter to generate a SPWM output signal.

In the depicted embodiment, a first duty cycle splitter 210 is configured to receive the first target duty cycle 156 and a Nth duty cycle splitter 212 is configured to receive the Nth target duty cycle 158. Although only 2 duty cycle splitters 210, 212 are shown to reduce complexity and improve clarity it is understood that the number N may vary. The first target duty cycle splitter 210 is configured to divide the first target duty cycle 156 by 1/N percent to determine a coarse first target duty cycle 220 (corresponding to an integer quotient of the division) and a first high-precision target duty cycle 230 (corresponding to a remainder of the division). Similarly, the Nth target duty cycle splitter 212 is configured to divide the Nth target duty cycle 158 by 1/N percent to determine a coarse Nth target duty cycle 222 (corresponding to an integer quotient of the division) and a Nth high-precision target duty cycle 232 (corresponding to a remainder of the division).

In the depicted embodiment, a coarse first controller 240 is configured to receive the coarse first target duty cycle 220, execute a second type controls and generate a coarse first output 242 used for controlling the first switch 124. A coarse Nth controller 250 is configured to receive the coarse Nth target duty cycle 222, execute the second controls and generate a coarse Nth output 252 used for controlling the Nth switch 126. A high-precision (or fine) controller 260 is configured to receive the first high-precision target duty cycle 230 and the Nth high-precision target duty cycle 232, execute a first type controls and generate a corresponding high-precision first output 262 and a high-precision Nth output 264 used for controlling the first switch 124 and the Nth switch 126 respectively. The first controls may be a high-precision control configured to perform on/off control during at least a portion of the time slot (e.g., linearly controllable from 0% to 100% of the time slot) and the second type controls may be a coarse type control that is configured to perform on/off control for either 0% or 100% of the time slot.

In the depicted embodiment, a first multiplexer 270 driven by a counter 280 is configured to combine the coarse and high-precision outputs 242, 262, of the controllers 240, 260 and generate the first SPWM output 172. Similarly, a Nth multiplexer 272 driven by the counter 290 is configured to combine the coarse and high-precision outputs 252, 264 of the controllers 250, 260 and generate the Nth SPWM output 174. The counter 290 is configured to generate N time slots in a repetitive manner. The multiplexers 270, 272 and the counter 290 may use time division multiplexing to generate the N time slots and combine the signals. Additional details about the timing and control aspects of the power conversion system 100 described with reference to FIG. 1, are described with reference to FIG. 3.

Figure 3:
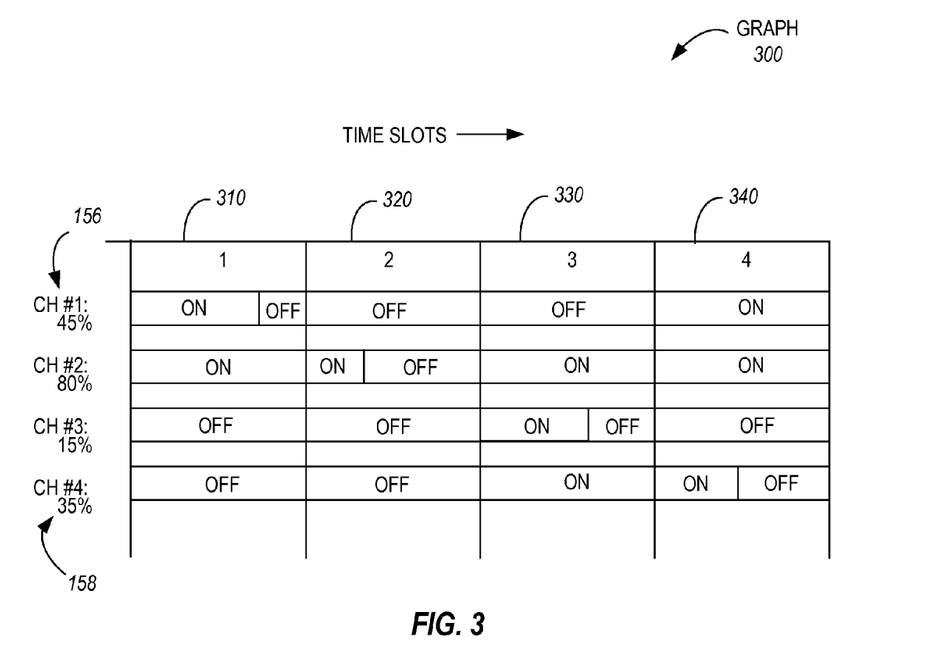
FIG. 3 illustrates in graphical form timing and control aspects of a shared pulse width modulator (SPWM) described with reference to FIGS. 1 and 2, in accordance with some embodiments.

FIG. 3 illustrates in graphical form timing and control aspects of a shared pulse width modulator (SPWM) described with reference to FIGS. 1 and 2, in accordance with some embodiments.

In some embodiments, N time slots are configured to process the N ones of the SPWM input and the SPWM output (e.g., target duty cycle inputs 156, 158 and SPWM outputs 172, 174). Configuration of the N time slots includes assigning each one of the N time slots to process each of the N ones including a dedicated one of the SPWM input and the SPWM output. Thus, in each time slot of the N time slots the SPWM 170 processes the target duty cycle signal for each one of the N channels, with the SPWM 170 performing dedicated processing for channel #N in time slot #N. The dedicated processing may include performing high-precision level control. The SPWM 170 determines whether a channel number for a selected SPWM input matches the time slot number (e.g., time slot #1 and channel #1). A matching of the channel number and time slot number may be identified as a dedicated one of the SPWM input. The SPWM 170 executes selectable controls in response to the match.

In some embodiments, each time slot of the N time slots may be assigned as a Mth time slot, M being an integer selectable between 1 and N. The Mth time slot having a dedicated phase to process in a dedicated manner the dedicated one identified by an Mth input of the N ones of the SPWM input. The Mth time slot also includes a shared phase to process in a shared manner the N ones of the SPWM input other than the dedicated one.

In some embodiments, N may be configured to be equal to 4. A graph 300 illustrates (on the X-axis) 4 time slots including a first time slot 310, a second time slot, 320, a third time slot 330 and a fourth time slot 340. The graph 300 illustrates (on the Y-axis) target duty cycle signals for the 4 SPWM input channels including the first target duty cycle 156 received on the first SPWM input (channel #1) and the Nth target duty cycle 158 received on the Nth SPWM input (channel #N). Thus, for the first time slot 310 a dedicated one of the SPWM input is channel #1 (receiving the first target duty cycle 156), for the second time slot 320 a dedicated one of the SPWM input is channel #2, for the third time slot 330 a dedicated one of the SPWM input is channel #3, and for the fourth time slot 340 a dedicated one of the SPWM input is channel #4 (receiving the Nth target duty cycle 158). High-precision duty cycle control may be performed when matching of a time slot # and channel # occurs and coarse level duty cycle control may be performed otherwise.

In the depicted embodiment, for illustrative purposes, each one of the 4 target duty cycle values are respectively assumed to be equal to 45%, 80%, 15% and 35%. It is understood that the actual values for the target duty cycle may vary from 0% to 100%. The duty cycle splitters 210, 212 may be configured to divide the target duty cycle by 1/N (N=4) or 25% and determine the coarse target duty cycle 220, 222 (corresponding to an integer quotient of the division) and the high-precision target duty cycle 230, 232 (corresponding to a remainder of the division) required. For example, for channel #2, having a target duty cycle of 80%, 3 coarse time slots (310, 330, and 340) generate 25% duty cycle each and the remaining 5% of the duty cycle is generated by the second time slot 320 for the high-precision duty cycle control. As another example, for channel #3, having a target duty cycle of 15% (which is less than 25%), 0 coarse time slots (310, 320, and 340) generate 0% duty cycle each and the remaining 15% of the duty cycle is generated by the third time slot 330 for the high-precision duty cycle control. In this example, since the target duty cycle is less than 25%, execution of the coarse level control or the second controls may be suspended.

In some embodiments, execution of the N time slots by the SPWM 170 may occur in a configurable sequence such as a round robin schedule based sequence. The SPWM 170 may be optimized to balance the overall processing load during the N time slots. For example, for channel #1, coarse level duty cycle control may be optionally performed in time slot #2 (320) instead of time slot #4 (340) to reduce overall load during the fourth time slot 340.

Figure 4:
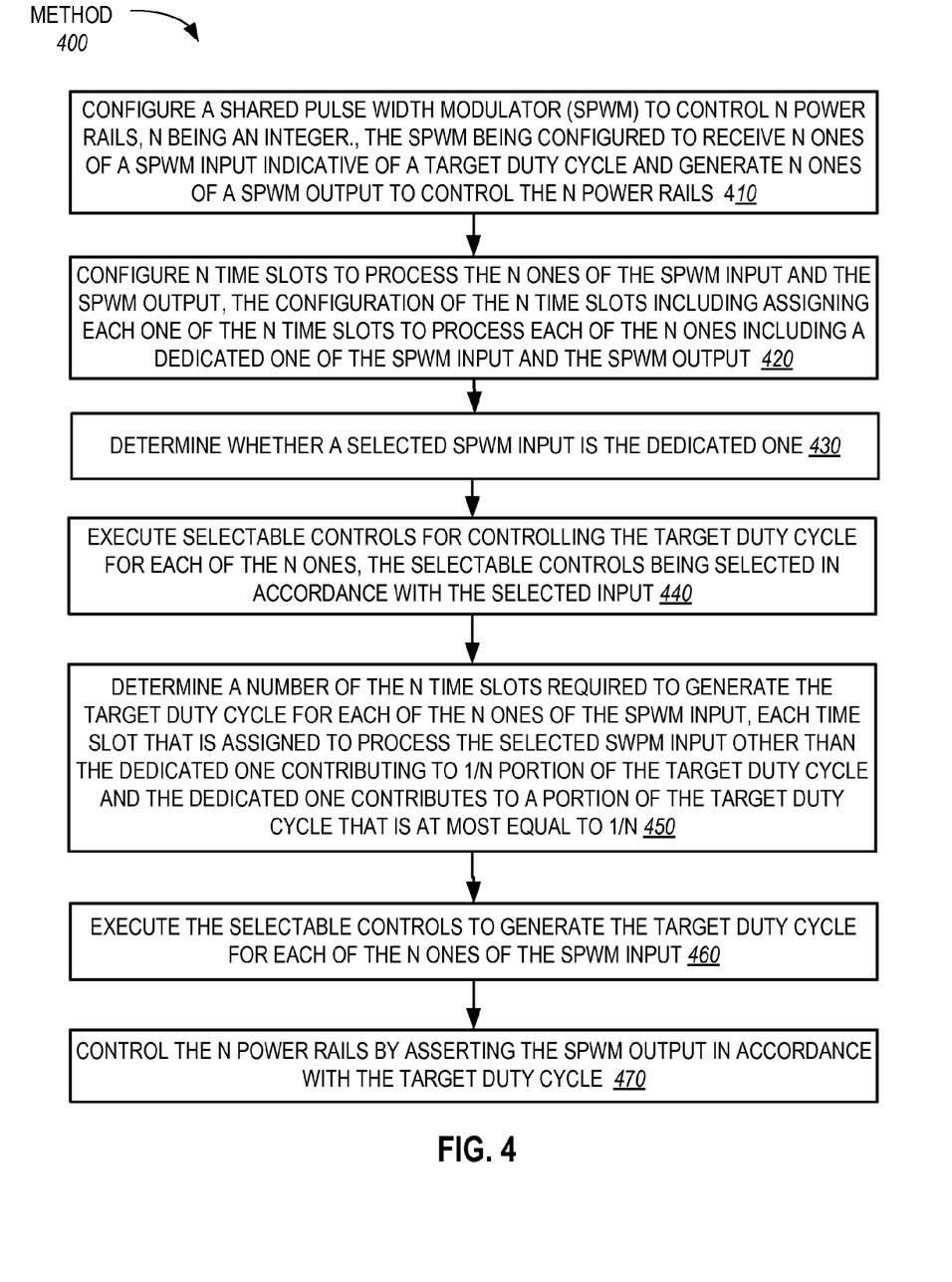
FIG. 4 is a flow diagram illustrating a method for power conversion, in accordance with some embodiments.

FIG. 4 is a flow diagram illustrating a method for power conversion, in accordance with some embodiments. In some embodiments, the methods described here may be implemented by a system such as the one described in FIG. 1 or FIG. 2.

Processing begins at 400 whereupon, at block 410, a shared pulse width modulator (SPWM) is configured to control N power rails, N being an integer. The SPWM is configured to receive N ones of a SPWM input indicative of a target duty cycle and generate N ones of a SPWM output to control the N power rails.

At block 420, N time slots are configured to process the N ones of the SPWM input and the SPWM output. The configuration of the N time slots includes assigning each one of the N time slots to process each of the N ones including a dedicated one of the SPWM input and the SPWM output. At block 430, a determination is made whether a selected SPWM input is the dedicated one. At block 440, selectable controls are executed for controlling the target duty cycle for each of the N ones, the selectable controls being selected in accordance with the selected input. At block 450, a number of the N time slots required is determined to generate the target duty cycle for each of the N ones of the SPWM input. Each time slot that is assigned to process the selected SWPM input other than the dedicated one contributes to 1/N portion of the target duty cycle and the dedicated one contributes to a portion of the target duty cycle that is at most equal to 1/N.

At block 460, the selectable controls are executed to generate the target duty cycle for each of the N ones of the SPWM input. At block 470, the N power rails are controlled by asserting the SPWM output in accordance with the target duty cycle.

Figure 5:
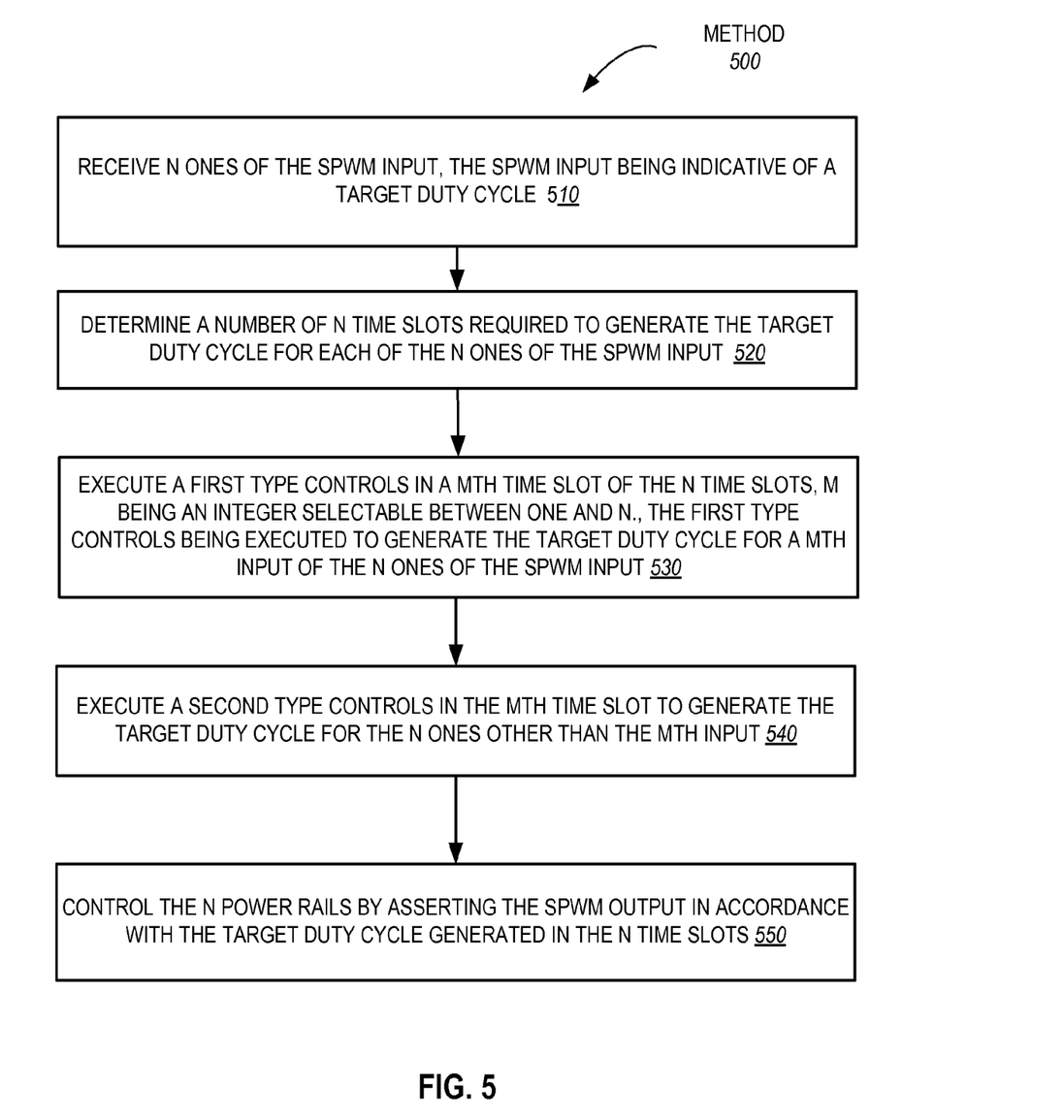
FIG. 5 is a flow diagram illustrating a method for controlling a power converter having N power rails described with reference to FIGS. 1, 2, and 3, in accordance with some embodiments.

FIG. 5 is a flow diagram illustrating a method for controlling a power converter having N power rails described with reference to FIGS. 1, 2, and 3, in accordance with some embodiments. In some embodiments, the methods described here may be implemented by a system such as the one described in FIG. 1 or FIG. 2.

At block 510, N ones of the SPWM input are received, the SPWM input being indicative of a target duty cycle. At block 520, a number of N time slots required to generate the target duty cycle for each of the N ones of the SPWM input is determined. At block 530, a first type controls in a Mth time slot of the N time slots is executed, M being an integer selectable between one and N. The first type controls is executed to generate the target duty cycle for a Mth input of the N ones of the SPWM input. At block 540, a second type controls in the Mth time slot is executed to generate the target duty cycle for the N ones other than the Mth input. At block 550, the N power rails are controlled by asserting the SPWM output in accordance with the target duty cycle generated in the N time slots.

It is understood, that various processes described above with reference to the methods 400 and 500 may be added, omitted, combined, altered, or performed in different order. For example, with reference to the method 500, the block 550 may be modified to assert or deassert the SPWM output in accordance with the target duty cycle generated in the N time slots. Other modifications to the methods 400 and 500 may also be made. For example, a plurality of fine power duty cycles may be determined according to a respective plurality of power values, and generating the respective plurality of power values using a time-shared pulse-width modulator (PWM), the time-shared PWM being configured to be modulated at the respective plurality of fine duty power cycles during a respective plurality of time slots.

Figure 6:
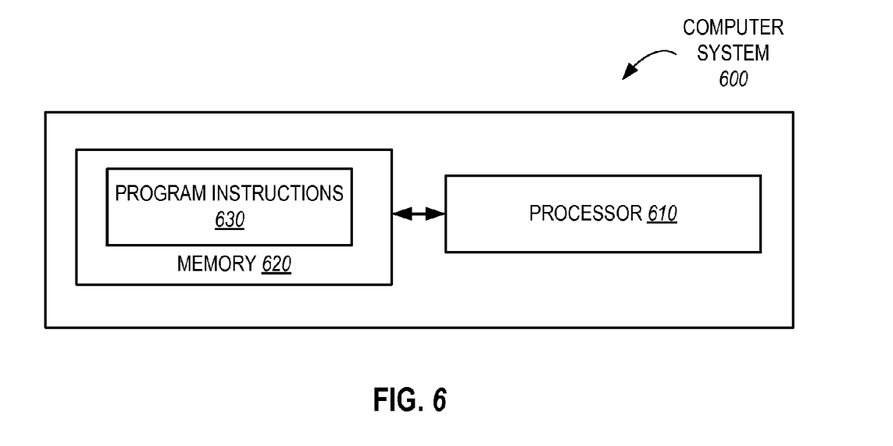
FIG. 6 illustrates a block diagram of a computer system, in accordance with some embodiments.

FIG. 6 illustrates a block diagram of a computer system, in accordance with some embodiments.

The computer system 600 includes a processor 610 coupled to a memory 620. The memory 620 is operable to store program instructions 630 that are executable by the processor 610 to perform one or more functions. It should be understood that the term "computer system" is intended to encompass any device having a processor that is capable of executing program instructions from a memory medium. In a particular embodiment, the various functions, processes, methods 400 and 500, and one or more devices of the power conversion system 100 described herein may be implemented using the computer system 600. For example, the SPWM 170 may be implemented using one or more of the computer system 600.

The various devices, functions, processes, methods, and operations performed or executed by the system 600 can be implemented as the program instructions 630 (also referred to as software or simply programs) that are executable by the processor 610 and various types of computer processors, controllers, microcontrollers, central processing units, microprocessors, digital signal processors, state machines, programmable logic arrays, and the like. In an exemplary, non-depicted embodiment, the computer system 600 may be networked (using wired or wireless networks) with other computer systems.

In various embodiments the program instructions 630 may be implemented in various ways, including procedure-based techniques, component-based techniques, object-oriented techniques, rule-based techniques, among others. The program instructions 630 can be stored on the memory 620 or any computer-readable medium for use by or in connection with any computer-related system or method. A computer-readable medium is an electronic, magnetic, optical, or other physical device or means that can contain or store computer program logic instructions for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

Those of skill will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for providing electrical voltages to N different power rails, the method comprising:

receiving N target duty cycle values for N power converter circuits, each power converter circuit being configured to be able to provide a regulated voltage to a corresponding power rail, the regulated voltage provided to a power rail by a power converter circuit being determined by a target duty cycle value for each power converter circuit;

determining a coarse portion of the target duty cycle value for each of the N power converter circuits by the division of each target duty cycle value by N, a coarse portion of a duty cycle value being equal to the integer portion of the quotient of a target duty cycle value and N;

determining a fine portion of the target duty cycle value for each of the N power converter circuits as the remainder portion of the quotient of a target duty cycle and N; and generating voltages from the N power converter circuits by activating each of the N power converter circuits using a corresponding control pulse for each power converter circuit that is output from a single, time-shared pulse-width modulator (PWM), the single, time-shared PWM being configured to output control pulses having duty cycles equal to the sum of the respective coarse portion of a target duty cycle value and the fine portion of a target duty cycle value.

2. The method of claim 1, where where N is the number of the plurality of voltage values, and N is a number of time slots of equal time value.

3. The method of claim 1, where the pulse width modulator uses duty cycles corresponding to the N time slots, and wherein a time-shared PWM is utilized for the plurality of power values during the corresponding N time slots.

4. A system for providing electrical power, the system comprising:
   a plurality of N power converter circuits, each power converter circuit being configured to be capable of providing a regulated voltage to a corresponding power rail, the regulated voltage provided to a power rail being determined by a target duty cycle for each power converter circuit;
   a single, time-shared pulse width modulator circuit (time-shared PWM) coupled to each of the plurality of N power converter circuits;
   the system being configured to determine for each power converter circuit having a target duty cycle, a coarse portion of the target duty cycle and a fine portion of the target duty cycle;
   the time-shared PWM being configured to be able to generate and provide control pulses to each power converter circuit having a target duty cycle, the control pulses for each power converter circuit having an actual duty cycle equal to the sum of the coarse portion and the fine portion of the target duty cycle for each power converter circuit.

5. The system of claim 4, further comprising:
   a processor coupled to the time-shared PWM, the processor being configured to be able to determine the coarse portion of a target duty cycle as the integer portion of the division of a target duty cycle for a power converter circuit by the value of N, the processor being additionally configured to determine the fine portion of a target duty cycle as the remainder portion of division of a target duty cycle for a power converter circuit by the value of N.

6. The system of claim 5, where N is a number of time slots, and where N is the number of different voltage values, and the time slots are of equal time value.

7. The system of claim 6, where the time-shared PWM uses duty cycles corresponding to the N time slots.

8. A computer program product stored on non-volatile computer operable medium, the computer program product comprising software code effective to:
   determining a first portion of a target duty cycle value for each power converter circuit of a plurality of N, power converter circuits, the first portion of the target duty cycle value for a power converter circuit being equal to the integer portion of the quotient of the target duty cycle value for the power converter circuit and the value of N;
   determining a second portion of the target duty cycle value for each power converter circuit of the plurality of N power converter circuits, the second portion of the target duty cycle value being equal to the remainder portion of the quotient of the target duty cycle value and the value of N; and
   cause a time-shared pulse width modulator (PWM) to generate output pulses for use by each of the plurality of N, power converter circuits, the generated output pulses for each power converter circuit having a duty cycle equal to the sum of the first portion of the target duty cycle for the power converter and the second portion of the target duty cycle for the power converter circuit.

9. The product of claim 8, where each generated output pulse corresponds to a time slot and the number of the time slots in a duty cycle is equal to N, where N is the number of the plurality of voltage values, and the time slots are of equal time value.

10. The product of claim 8, where the time-shared PWM uses duty cycles corresponding to the N time slots, and where the time-shared PWM is utilized for the plurality of voltage values during corresponding of the N time slots.

* * * * *